H. H. BEACH.
Grain Separator.
No. 33,231.
Patented Sept. 10, 1861.
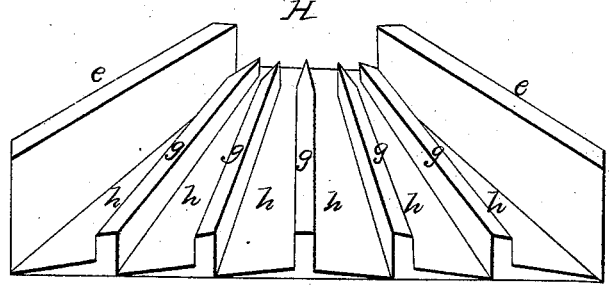
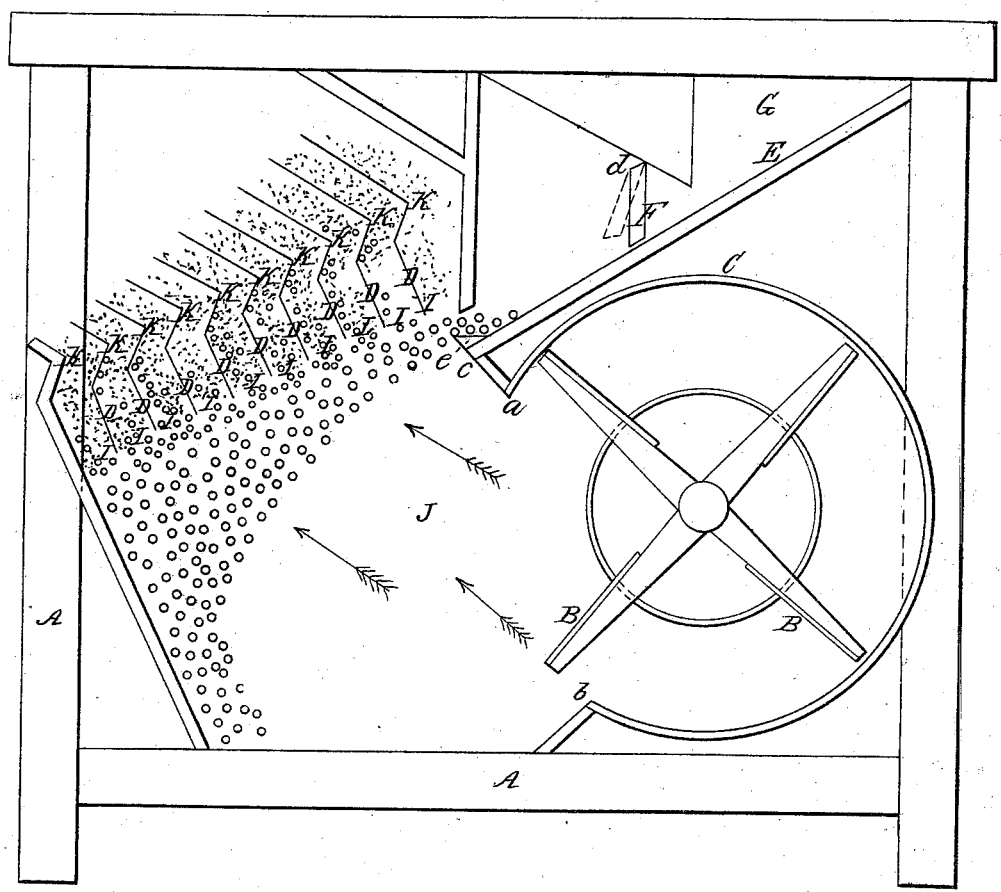

UNITED STATES PATENT OFFICE.

HENRY H. BEACH, OF PHILADELPHIA, PENNSYLVANIA.

IMPROVEMENT IN GRAIN-SEPARATORS.

Specification forming part of Letters Patent No. 33,231, dated September 10, 1861.

*To all whom it may concern:*

Be it known that I, HENRY H. BEACH, of Philadelphia, in the county of Philadelphia and State of Pennsylvania, have invented a new and Improved Mode of Constructing Grain-Winnowers. I do hereby declare that the following is a full and exact description thereof, reference being had to the accompanying drawings, and to the letters of reference marked thereon.

Figure 1 is a vertical sectional view of a grain-winnower containing my invention. Fig. 2 is a face view of a part of my invention which I call a "grain-spreader."

The nature of my invention consists in combining, with a fan in a grain-winnower, a series of deflectors forming by their arrangement with each other a series of flues, and so placed in relation to the fan that a direct blast of air is driven by the action of the fan itself in about equal quantities through the several flues, while the grain when acted upon only by its own gravity is allowed to fall from the delivery-board directly down between the fan and the said series of deflectors without coming in contact with either, and in forming in the several deflectors elbows, which hinder the escape of the grain through the flues when acted upon by the blast, while they allow the escape of the impurities intended to be removed by the blast.

A is the frame of the winnower, which may be made of any convenient form to contain the drum, the fan, and the other parts of the winnower.

B is the fan, and C the drum, a portion of the circumference of which from the point *a* to the point *b* must be left uninclosed to permit the air to pass directly off from the fan into the chamber J of the winnower.

The lines marked D represent a series of deflectors, the number of which will depend upon the size of the winnower. They may be formed of wood or sheets of metal extending in length across the winnower in front of the fan B and of any width desired. They should be set with their surfaces, when considered with reference to a line drawn horizontally through the center of the fan, at about the angle represented in the drawings. It is essential that they should all be placed on the opposite side from the fan of a perpendicular line dropped from the lower edge of the delivery-board E, and being arranged with their lower edges on a right line, or nearly so, that the upper end at least of the series shall extend somewhat above the lower edge of the delivery-board E and be placed at a little distance from it, and that the lower end of the series shall be placed at least fifteen degrees from a perpendicular dropped from the lower edge *c* of the delivery-board E, measured on an arc drawn from that point. The lower end of the said series of deflectors need not, however, be confined to the point indicated. It may be fixed at any point above and beyond it, at the option of the manufacturer or operator, the upper end of the said series being kept at or near the point I have before designated as the proper one for it.

K represents elbows placed above and attached to the deflectors D for the purpose of arresting the escape of any kernel of grain that may be driven into the channels between the deflectors, and more effectually secure their return into the mass of cleaned grain.

F is a valve placed in and made to fill the throat of the hopper G. It is hinged at the upper edge *d* and arranged to swing inward in the direction of the flow of grain over the delivery-board E, but closes the throat of the hopper when swung in the opposite direction. The design of this valve is to prevent the escape of the blast from the fan through the throat of the hopper. It may be formed of a single piece of metal or wood; but I recommend as the better mode that it be made in sections of only a few inches in length, each section being hinged to swing independently, thus permitting an ear of corn or other large substance to pass the throat by lifting a single section, and thus avoid clogging.

Fig. 2, letter H represents a grain-spreader designed to spread the grain equally over the delivery-board E, and thus secure its delivery into the blast in a current of uniform volume throughout its entire lateral extent. It consists of a table in the form of a truncated triangle, the truncated side being about the width of the spout that may be used to convey the grain to the winnower, and the opposite side about the width of the winnower or the delivery-board E. The two lateral edges *e e* are inclosed with sides wide enough to prevent the escape of the grain over them. On its face are placed partitions (designated by the letter $g$) of suitable height to prevent the grain while passing through the channels $h$ between them from escaping from one to another. They are arranged radially, as represented in the drawings. This spreader is placed on the opposite side of the hopper G from the delivery-board E, and at such an inclination that its surface is about at right angles with the surface of the said delivery-board. Then the bottom of each channel is so made that a line drawn on its surface at any place at right angles with a line drawn through the center of the channel shall be horizontal for the purpose of preventing the grain while flowing through the channels from piling up against their sides and securing the spreading out of the grain over the entire width of the several channels in its passage through them.

The upper ends of the partitions $g$ should be rounded off, as represented, and the spreader placed in such relation to the spout which conducts the grain to it that some portion of the partitions shall be above the floor or bottom of the spout.

The operation of my invention is as follows: The grain passes first over the spreader H in a uniform sheet or current the full width of the winnower onto the delivery-board E, thence down over the delivery-board, which is properly inclined and furnished at the lower edge with a cleat or ledge $e$, which serves to arrest somewhat the flow of the grain and permits it to fall from the delivery-board very nearly as from a state of rest. Here it descends without obstruction immediately into the blast direct from the fan. The winnowing process is felt by the grain throughout its entire descent through the winnowing-chamber J. The effect is to blow the impurities and lighter seeds that are mingled with the grain outward toward the deflectors D and up through the channels I. The dust, chaff, with other impurities, as well as chess, smut, and all seeds lighter than the grain being cleaned, are driven entirely out, while any kernels of the grain which may be forced up the channels fall back again, and finally descend to the bottom of the chamber J with the mass of cleaned grain. It is well known that the most perfect way of separating grain from impurities and adventitious seeds is by simple winnowing, relying upon the difference in the specific gravity of the good grain and impurities. The objection to such a winnowing process simply has been that while the greater portion of the grain—that falling within a certain distance of the fan—is well cleaned, and a large part of the impurities are blown entirely away from the grain, there has been an intervening space in which portions of the good grain and the impurities have fallen mingled together. The peculiarity of my invention consists in placing just in this intermediate space the series of deflectors D, so arranged as to receive this stratum of mingled grain and impurities blown to the outer side of the winnowing-chamber J, (which is represented in Fig. 1 by the red dots $j$;) also, in placing the deflectors above and outside entirely of the current of grain as it falls from the hopper or delivery-board, so the grain meeting with no obstruction may be passed through the winnower and cleaned at any desired rate.

What I claim as new, and desire to secure by Letters Patent, is—

1. The combination of the series of deflectors D with the fan B and the delivery-board E, when constructed and arranged substantially as described, and for the purpose set forth.

2. The elbow K, combined with the deflectors D and the fan B, the whole substantially as and for the purposes described.

HENRY H. BEACH.

Witnesses:
CHAS. SHAW,
WM. GARDNER SMITH.